US006870956B2

(12) United States Patent
Qi et al.

(10) Patent No.: US 6,870,956 B2
(45) Date of Patent: Mar. 22, 2005

(54) METHOD AND APPARATUS FOR SHOT DETECTION

(75) Inventors: Wei Qi, Santa Clara, CA (US); Dong Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 659 days.

(21) Appl. No.: 09/882,787

(22) Filed: Jun. 14, 2001

(65) Prior Publication Data

US 2002/0196974 A1 Dec. 26, 2002

(51) Int. Cl.$^7$ .................................................. G08K 9/00
(52) U.S. Cl. ...................... 382/170; 382/236; 348/700
(58) Field of Search ................................ 382/168, 170, 382/236, 239, 268, 270, 272, 274, 275, 305; 348/700

(56) References Cited

U.S. PATENT DOCUMENTS

| | | | |
|---|---|---|---|
| 5,442,633 A | | 8/1995 | Perkins et al. ............... 370/331 |
| 5,530,963 A | | 6/1996 | Moore et al. ................ 709/243 |
| 5,625,877 A | | 4/1997 | Dunn et al. .................. 455/454 |
| 5,642,294 A | * | 6/1997 | Taniguchi et al. ........... 348/700 |
| 5,659,685 A | | 8/1997 | Williams et al. ............. 709/220 |
| 5,745,190 A | * | 4/1998 | Ioka ............................ 348/700 |
| 5,751,378 A | * | 5/1998 | Chen et al. .................. 348/700 |
| 5,774,593 A | * | 6/1998 | Zick et al. ................... 382/236 |
| 5,801,765 A | * | 9/1998 | Gotoh et al. ................. 348/155 |
| 5,835,163 A | * | 11/1998 | Liou et al. ................... 348/700 |
| 5,900,919 A | * | 5/1999 | Chen et al. .................. 348/700 |
| 5,911,008 A | * | 6/1999 | Niikura et al. ............... 382/236 |
| 5,920,360 A | * | 7/1999 | Coleman, Jr. ................ 348/700 |
| 5,959,697 A | * | 9/1999 | Coleman, Jr. ................ 348/700 |
| 5,990,980 A | * | 11/1999 | Golin .......................... 348/700 |
| 5,995,095 A | * | 11/1999 | Ratakonda ................ 715/500.1 |
| 6,462,754 B1 | * | 10/2002 | Chakraborty et al. ........ 345/723 |
| 2003/0152363 A1 | | 8/2003 | Jeannin et al. |

FOREIGN PATENT DOCUMENTS

| | | |
|---|---|---|
| EP | 1168840 | 1/2002 |
| EP | 1213915 | 6/2002 |
| GB | 2356080 | 5/2001 |

OTHER PUBLICATIONS

Yeo, et al. "Rapid scene analysis on compressed video", IEEE, pp. 533544, 1995.*
Gu, et al. "Dissolve detection in MPEG compressed video", IEEE, pp. 1692–1696, 1997.*
Gamaz, et al. "Robust scene–change detection in MPEG compressed domain", Elec. & Comp. Eng., pp. 95–99, 1998.*
O'Toole "An MPEG–1 shot boundary detector using XIL colour histograms", Dublin City University, pp. 1–7, 1998.*
Heng, et al. "Post shot boundary detection technique: Flashlight scene determination", University of Western Australia, pp. 447 450, 1999.*
Lelescu, et al. Real–time scene change detection on compressed multimedia bitstream based on statistical sequential analysis IEEE, pp. 1141–1144, 2000.*
Yusoff, et al. "Video shot cut detection using adaptive thresholding", University of Surrey, pp. 1–10, 2000.*

(List continued on next page.)

Primary Examiner—Daniel Miriam
(74) Attorney, Agent, or Firm—Lee & Haves, PLLC

(57) ABSTRACT

A system identifies an abrupt transition in content between two frames, and determines whether the abrupt transition was caused by a shot boundary between the two frames or by a flashlight event. Identification of the abrupt transition in content includes calculating a difference in light intensity histograms between the current frame and a preceding frame, and comparing the histogram difference to a dynamically determined threshold. Further, an average light intensity based method is used to determine whether the abrupt transition was caused by a shot boundary or by a flashlight event.

26 Claims, 6 Drawing Sheets

OTHER PUBLICATIONS

U.S. Appl. No. 10/285,933, filed Nov. 1, 2002, inventors Yu–Fei Ma et al., entitled "Systems and Methods for Generating a Motion Attention Model,".

Lee, Keansub et al., "Perception–Based Image Transcoding for Universal Multimedia Access," School of Electical Engineering Korea University, Seoul, Korea, 2001 IEEE, pp. 475–478.

Christopoulos, Charilaos et al., "The JPEG2000 Still Image Coding System: An Overview," IEEE Transactions on Consumer Electronics, vol. 46, No. 4, pp. 1103–1127, Nov. 2000.

Chen, Jinlin et al., "Function–based Object Model Towards Website Adaptation," (2001) Proc. of the 10th Int. WWW Conf. pp. 1–21.

U.S. Appl. No. 10/179,161, filed Jun. 24, 2002, inventors Jin–Lin Chen & Wei–Ying Ma, entitled "Function–based Object Model for Web Page Display in a Mobile Device,".

U.S. Appl. No. 10/286,053, filed Nov. 1, 2002, inventors Yu–Fei Ma et al., entitled "Systems and Methods for Generating a Comprehensive User Attention Model,".

U.S. Appl. No. 10/286,348, filed Nov. 1, 2002, inventors Xian–Sheng Hua et al., entitled "Systems and Methods for Automatically Editing a Video,".

M.A. Smith & T. Kanade, "Video Skimming and Characterization through the Combination of Image and Language Understanding Techniques," Proc. of Computer Vision and Pattern Recognition, 1997 IEEE, pp. 775–781.

L. Itti & C. Koch, "Computational Modelling of Visual Attention," Nature Reviews/Neuroscience, vol. 2, Mar. 2001, pp. 1–11.

L. Itti, C. Koch & E. Niebur, "A Model of Saliency–based Visual Attention for Rapid Scene Analysis," IEEE Trans. on Pattern Analysis and Machine Intelligence, 1998, 5 pages.

L. Itti & C. Koch, "A Comparison of Feature Combination Strategies for Saliency–Based Visual Attention Systems," Proc. of SPIE Human Vision and Electronic Imaging IV (HVEI'99), San Jose, CA, vol. 3644, pp. 473–482, Jan. 1999.

Yu–Fei Ma & Hong–Jiang Zhang, "A New Perceived Motion Based Shot Content Representation," Microsoft Research China, 4 pages.

Yu–Fei Ma & Hong–Jiang Zhang,"A Model of Motion Attention for Video Skimming," Microsoft Research Asia, 4 pages.

Colin O'Toole et al., "Evaluation of Automatic Shot Boundary Detection on a Large Video Test Suite," School of Computer Applications & School of Electronic Engineering, Dublin City University, Glasnevin, Dublin, Ireland, Challenge of Image Retrieval, Newcastle, 1999, pp. 1–12.

T. Lin, H.J. Zhang, Q.Y. Shi, "Video Scene Extraction by Force Competition," IEEE Intl. Converence on Multimedia and Expo (ICME 001), Waseda University, Tokyo, Japan, Aug. 22–25, 2001, 4 pages.

U.S. Appl. No. 10/371,125, filed Feb. 20, 2003 Inventors-Wei–Ying Ma et al. Entitled "Systems and Methods for Enhanced Image Adaptation,".

Lienhart, R. et al., "On the Detection and Recognition of Television Commercials," University of Mannheim, 17 pages.

Hargrove, Thomas, "Logo Detection in Digital Video" Math 100 Mar. 6, 2001, http://toonarchive.com/logo–detection/9 pages.

http://www.fatalfx.com/nomad/ "NOMAD (No More Advertising)," Feb. 17, 2003, 4 pages.

Sadlier, David A., "Automatic TV Advertisement Detection from MPEG Bitstream," Centre for Ditial Video Processing/Research institute for Network & Communication Eng. Dublin City University, 12 pages.

Sanchez, Juan Maria, "AudiCom: a Video Analysis System for Auditing Commercial Broadcasts," Computer Vision Center Department d'Informatica Universitat Autonoma de Barcelona, 5 pages.

Zabih, Ramin, "A Feature–Based Algorithm for Detecting and Classifying Scene Breaks," Computer Science Department, Cornell University, 16 pages.

Lu Lie et al., "Content Analysis for Audio Classification and Segmentation" IEEE Transactions on Speech and Audion Processing, vol. 10, No. 7, Oct. 2002, pp. 504–516.

Lu, Lie et al., "A Robust Audio Classification and Segmentation Method," Microsoft Research China, 9 pages.

Lu, Lie et al., "Content–Based Audio Segmentation Using Support Vector Machines," 2001, IEEE, pp. 956–959.

JHA, UMA S., "Wireless Landscape–Need for Seamless Connectivity," Wireless Personal Communications, 2002, pp. 275–283.

Held, Gibert, "Focus on Agere System's Orinoco PC Card," International Journal of Network Management, Jan. 2002, pp. 187–193.

Cherry, Steven M., "Pesky Home Networks Trouble cable Behemoths," IEEE Spectrum, Apr. 2002, pp. 60–61.

Niebur, E. et al., "Computational Architectures for Attention," The Attentive Brain, Chapter 9, 1998, pp. 163–186.

Wolfe, J. M. et al., "Deploying Visual Attentin: The Guided Search Model," Al and the Eye, Chapter 4, 1990, pp. 79–103.

Zadeh, L. A., "Probability Measures of Fuzzy Events," Journal of Mathematical Analysis and Applications, 23 1968, pp. 421–427.

Tsotsos, J. K. et al., "Modeling Visual Attention Via Selective Tuning," Artificial Intelligence v78, 1995, pp. 507–545.

Ma, Y.–f. et al., "A Model of Motion Atention for Video Skimming," IEEE ICIP, 2002m, pp. I–129 to I–132.

Sahoo, P.K. et al., "Threshold Selction Using a Minimal Histogram Entropy Difference," Optical Engineering, v36, No. 7, Jul. 1997, pp. 1976–1981.

Milanese, R. et al., "Attentive Mechanisms for Dynamic and Static Scene Analysis," Optical Engineering, v34, no8, Aug. 1995, pp. 2428–2434.

Jing, et al., "An Effective Region–Based Image Retrieval Framework," From ACM Multimedia 2002, 28 pages.

Li, et al., "Statistical Learning of Multi–View Face Detection," Proceedings of ECCV, 2002, 25 pages.

Ahmad, Subutai, "Visit: A Neural Model of Covert Visual Attention," Advances in Neural Information Processing Systems, v. 4, 1991, pp. 420–427.

Baluja et al., "Expectation–Based Selective Attention for Visual Monitoring andControl of a Robot Vehicle," Robotics and Autonomous System, v. 22, No. 3–4, Dec. 1997, pp. 329–344.

Deng et al., "Peer Group Filtering and Perceptual Color Image Quantization," Proceedings of IEEE International Symposium on Circuits and systems, vol. 4, 1999, pp. 21–24.

Itti et al., "A Model of Saliency–based Visual Attention for Rapid Scene Analysis," IEEE Transactions on Pattern Analysis and Machine Intelligence, 1998.

Ma et al., "A User Attention Model for Video Summarization," Proceedings of ICIP, 2002.

Chen et al., "A Visual Attention Model for Adapting Images on Small Displays," ACM Multimedia Systems Journal, 2003.

Lu, Xiaoye et al., "An Integrated Correlation Measure for Semantic Video Segmentation," IEEE 2002, 4 pages.

Fan, Xin et al., "Visual Attention Based Image Browsing on Mobile Devices," 4 pages.

Divakaran, Ajay et al., "Video summarization using descriptors of motion activity: A motion activity based approach to key–frame extraction from video shots." (:SPIE IS&T Oct. 1, 2001) V10 n 4 pp 909–916.

* cited by examiner

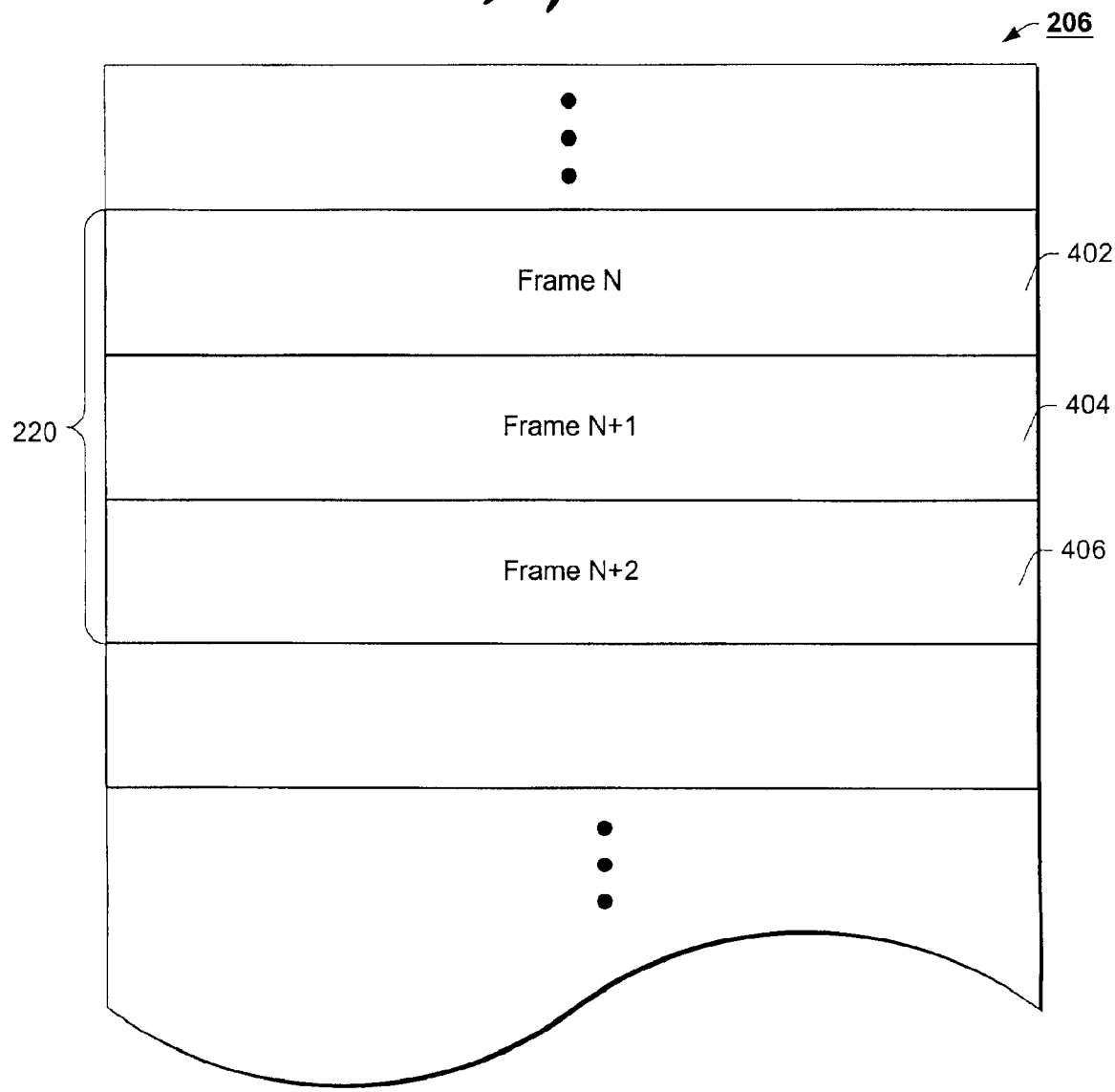

METHOD AND APPARATUS FOR SHOT DETECTION

TECHNICAL FIELD

This invention generally relates to image processing and analysis and, more particularly, to a method and apparatus for shot detection.

BACKGROUND

With recent improvements in processing, storage and networking technologies, many personal computing systems have the capacity to receive, process and render multimedia objects (e.g., audio, graphical and video content). One example of such computing power applied to the field of multimedia rendering, for example, is that it is now possible to "stream" media content from a remote server over a data network to an appropriately configured computing system for rendering on the computing system. Many of the rendering systems provide functionality akin to that of a typical video cassette player/recorder (VCR). However, with the increased computing power comes an increased expectation by consumers for even more advanced capabilities. A prime example of just such an expectation is the ability to rapidly identify, store and access relevant (i.e., of particular interest to the user) media content. Conventional media processing systems fail to meet this expectation.

In order to store and/or access a vast amount of media efficiently, the media must be parsed into uniquely identifiable segments of content. Many systems attempt to parse video content, for example, into shots. A shot is defined as an uninterrupted temporal segment in a video sequence, and often defines the low-level syntactical building blocks of video content. Shots, in turn, are comprised of a number of frames (e.g., 24 frames-per-second, per shot). In parsing the video into shots, conventional media processing systems attempt to identify shot boundaries by analyzing consecutive frames for deviations in content from one another. A common approach to distinguish content involves the use of color histogram based segmentation. That is, generating a color histogram for each of a number of consecutive frames and analyzing the histogram difference of consecutive frames to detect a significant deviation. A deviation within a single frame that exceeds a deviation threshold is determined to signal a shot boundary.

While the use of color histogram may prove acceptable in certain limited circumstances, it is prone to false shot boundary detection in many applications. Take, for example, news footage. News footage often includes light flashes from camera flash bulbs, emergency vehicle lights, lightning from a storm, bright stage lights for the video camera equipment and the like. The result is that one shot of such news footage may include a number of light flashes (flashlight phenomena) which conventional shot boundary detection schemes mistake for shot boundaries. Another example of media including the flashlight phenomena is action and science fiction movies, sporting events, and a host of other media—media for which conventional shot detection schemes are ill-suited.

The challenge of distinguishing flashlight phenomena from actual shot boundaries is not trivial. The limitation of conventional shot boundary detection schemes is that they assume a flashlight only occurs across a single frame. In the real world, not only can flashlights span multiple frames, the can span a shot boundary.

Another limitation of such conventional shot boundary detection schemes is that of threshold selection, i.e., the threshold of, for example, color histogram deviation that signals a shot boundary. Many conventional shot boundary detection schemes use global, pre-defined thresholds, or simple local window based adaptive thresholds. Global thresholds generally provide the worst performance as video properties often vary a lot and, quite simply, one size (threshold) does not fit all. The local window based adaptive threshold selection method also has its limitations insofar as in certain situations, the local statistics are polluted with strong noises such as, for example, loud noises and/or flashlight effects.

Thus, a method and apparatus for shot boundary detection is presented, unencumbered by the inherent limitations commonly associated with prior art systems.

SUMMARY

A method and apparatus for shot boundary detection are described herein. In accordance with a first example embodiment, a method identifies an abrupt transition in content between two frames, and determines whether the abrupt transition was caused by a shot boundary between the two frames or by a flashlight event is presented.

In one implementation, identifying an abrupt transition includes calculating a difference in light intensity histograms between the current frame and a preceding frame, and comparing the histogram difference to a dynamically determined threshold, such that an abrupt transition is indicated if the histogram difference exceeds the threshold.

In another embodiment, a shot boundary detector statistically analyzes one or more attributes associated with content in video frames to detect abrupt and/or gradual transitions in the video content indicative of a shot boundary. A flashlight detector, responsive to the shot boundary detector, distinguishes abrupt transitions in the video content caused by flashlight events from those caused by actual shot boundaries, to reduce false-positive identification of flashlight events as shot boundaries.

BRIEF DESCRIPTION OF THE DRAWINGS

The same reference numbers are used throughout the figures to reference like components and features.

FIG. 4 is a graphical illustration of an example data structure to store frames of an identified shot, according to one embodiment of the present invention;

DETAILED DESCRIPTION

This invention concerns a method and apparatus for shot detection. In this regard, the present invention overcomes a number of the limitations commonly associated with the prior art image storage and retrieval systems. The inventive nature of the present invention will be developed within the context of visual media content such as, for example, video media content. It is to be appreciated, however, that the scope of the present invention is not so limited. The innovative media analysis agent introduced below may well utilize the inventive concepts described herein to perform media segmentation on any of a wide variety of multimedia content including, for example, audio content, graphical content, and the like. In this regard, the example embodiments presented below are merely illustrative of the scope and spirit of the present invention.

In describing the present invention, example network architectures and associated methods will be described with reference to the above drawings. It is noted, however, that modification to the methods and apparatus described herein may well be made without deviating from the present invention. Indeed, such alternate embodiments are anticipated within the scope and spirit of the present invention.

EXAMPLE COMPUTING SYSTEM

Figure 1:
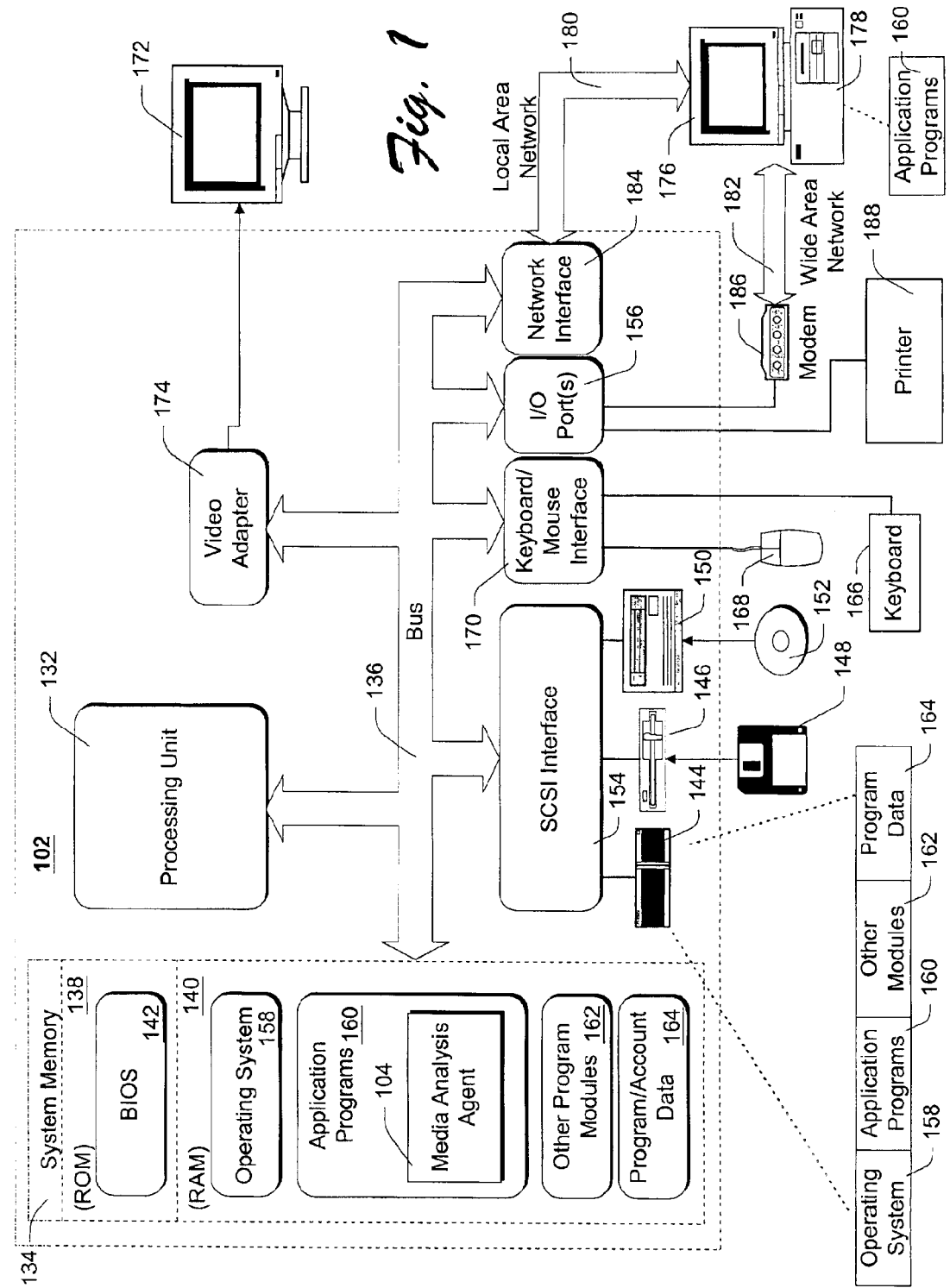
FIG. 1 is a block diagram of an example computing system incorporating the teachings of the present invention.

FIG. 1 illustrates an example computing system 102 including an innovative media analysis agent 104, to analyze media content, identify and segment the content into shots based, at least in part, on a statistical analysis of the light content of at least a subset of the frames comprising the video content. Unlike the conventional segmentation systems introduced above, however, the media analysis agent 104 is able to accurately distinguish flashlight phenomena occurring within a shot from actual shot boundaries, even if the shot boundary is embedded within the flashlight effect. In accordance with another aspect of the invention, to be described more fully below, media analysis agent 104 overcomes the limitations commonly associated with threshold selection introduced above, by adopting an adaptive threshold selection technique, to dynamically select a threshold suitable for the content of the media. It will be evident, from the discussion to follow, that computer 102 is intended to represent any of a class of general or special purpose computing platforms which, when endowed with the innovative analysis agent 104, implement the teachings of the present invention in accordance with the first example implementation introduced above. It is to be appreciated that although analysis agent 104 is depicted in the context of FIG. 1 as a software application, computer system 102 may alternatively support a hardware implementation of agent 104 as well. In this regard, but for the description of analysis agent 104, the following description of computer system 102 is intended to be merely illustrative, as computer systems of greater or lesser capability may well be substituted without deviating from the spirit and scope of the present invention.

As shown, computer 102 includes one or more processors or processing units 132, a system memory 134, and a bus 136 that couples various system components including the system memory 134 to processors 132.

The bus 136 represents one or more of any of several types of bus structures, including a memory bus or memory controller, a peripheral bus, an accelerated graphics port, and a processor or local bus using any of a variety of bus architectures. The system memory includes read only memory (ROM) 138 and random access memory (RAM) 140. A basic input/output system (BIOS) 142, containing the basic routines that help to transfer information between elements within computer 102, such as during start-up, is stored in ROM 138. Computer 102 further includes a hard disk drive 144 for reading from and writing to a hard disk, not shown, a magnetic disk drive 146 for reading from and writing to a removable magnetic disk 148, and an optical disk drive 150 for reading from or writing to a removable optical disk 152 such as a CD ROM, DVD ROM or other such optical media. The hard disk drive 144, magnetic disk drive 146, and optical disk drive 150 are connected to the bus 136 by a SCSI interface 154 or some other suitable bus interface. The drives and their associated computer-readable media provide nonvolatile storage of computer readable instructions, data structures, program modules and other data for computer 102.

Although the example operating environment described herein employs a hard disk 144, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk 144, magnetic disk 148, optical disk 152, ROM 138, or RAM 140, including an operating system 158, one or more application programs 160 including, for example, analysis agent 104 incorporating the teachings of the present invention, other program modules 162, and program data 164 (e.g., resultant language model data structures, etc.). A user may enter commands and information into computer 102 through input devices such as keyboard 166 and pointing device 168. Other input devices (not shown) may include a microphone, joystick, game pad, satellite dish, scanner, or the like. These and other input devices are connected to the processing unit 132 through an interface 170 that is coupled to bus 136. A monitor 172 or other type of display device is also connected to the bus 136 via an interface, such as a video adapter 174. In addition to the monitor 172, personal computers often include other peripheral output devices (not shown) such as speakers and printers.

As shown, computer 102 operates in a networked environment using logical connections to one or more remote computers, such as a remote computer 176. The remote computer 176 may be another personal computer, a personal digital assistant, a server, a router or other network device, a network "thin-client" PC, a peer device or other common network node, and typically includes many or all of the elements described above relative to computer 102, although only a memory storage device 178 has been illustrated in FIG. 1. In this regard, innovative analysis agent 104 may well be invoked and utilized by remote computing systems such as, for example, computing system 176.

As shown, the logical connections depicted in FIG. 1 include a local area network (LAN) 180 and a wide area network (WAN) 182. Such networking environments are commonplace in offices, enterprise-wide computer networks, Intranets, and the Internet. In one embodiment, remote computer 176 executes an Internet Web browser program such as the "Internet Explorer" Web browser manufactured and distributed by Microsoft Corporation of Redmond, Washington to access and utilize online services.

When used in a LAN networking environment, computer 102 is connected to the local network 180 through a network interface or adapter 184. When used in a WAN networking environment, computer 102 typically includes a modem 186 or other means for establishing communications over the wide area network 182, such as the Internet. The modem 186, which may be internal or external, is connected to the bus 136 via input/output (I/O) interface 156. In addition to network connectivity, I/O interface 156 also supports one or more printers 188. In a networked environment, program modules depicted relative to the personal computer 102, or portions thereof, may be stored in the remote memory storage device. It will be appreciated that the network connections shown are exemplary and other means of establishing a communications link between the computers may be used.

Generally, the data processors of computer 102 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the innovative steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

It should be appreciated that although depicted as a separate, stand alone application in FIG. 1, media analysis agent 104 may well be implemented as a function of a higher level application, e.g., a media player, a media librarian/database, a ripper application, etc.

EXAMPLE MEDIA ANALYSIS AGENT

Figure 2:
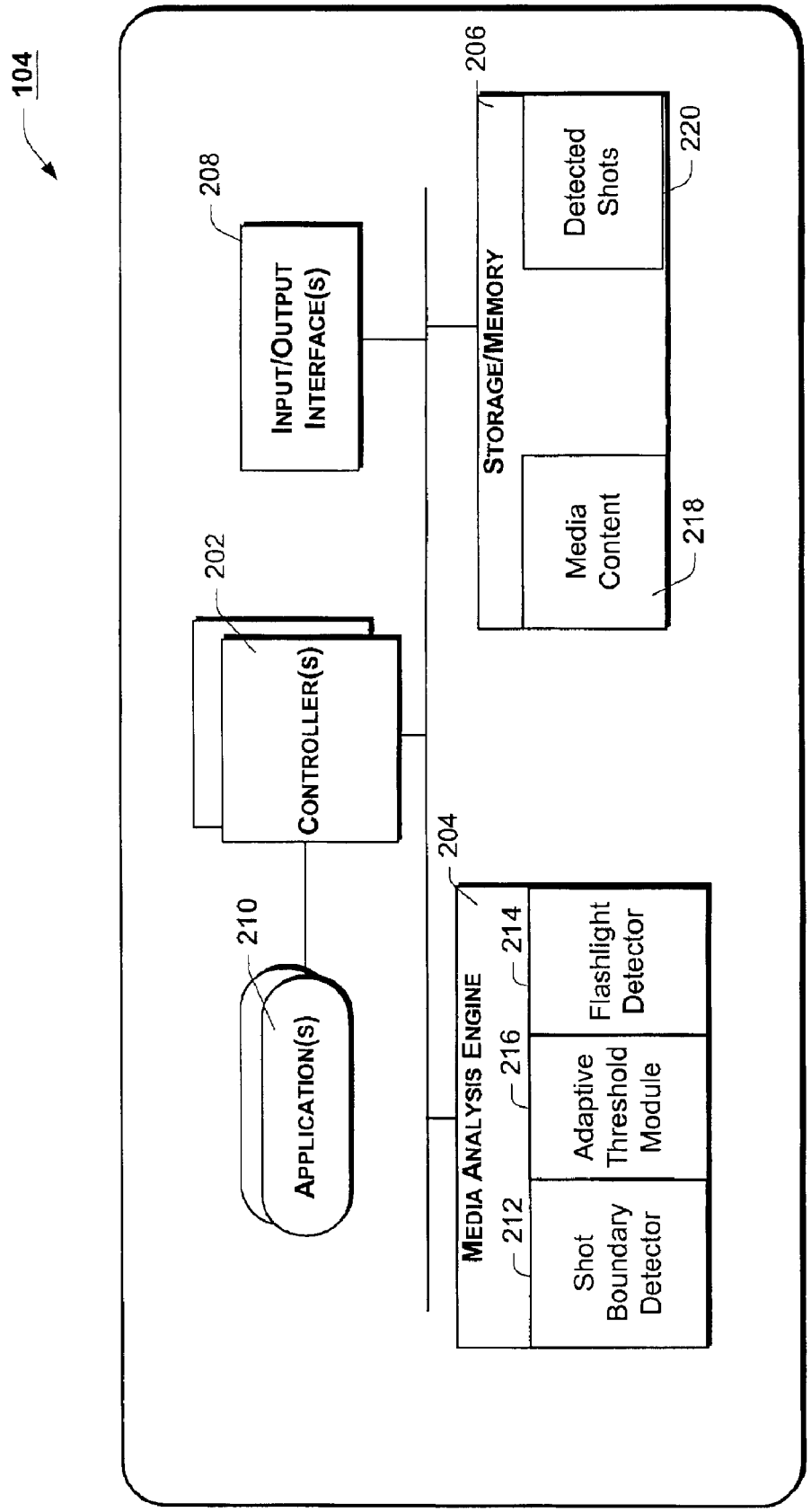
FIG. 2 is a block diagram of an example media analysis agent to identify shot boundaries, in accordance with one example embodiment of the present invention.

FIG. 2 illustrates a block diagram of an example media analysis agent 104 incorporating the teachings of the present invention, according to one embodiment of the invention. In accordance with the illustrated example embodiment of FIG. 2, media analysis agent 104 is depicted comprising one or more controller(s) 202, a media analysis engine 204, memory/storage device 206, input/output interface(s) 208 and, optionally, one or more applications 210, each communicatively coupled as shown. As introduced above, media analysis agent 104 analyzes one or more attributes of received frames and, using a dynamically selected threshold, segments the video content into shots.

In accordance with one example implementation of the present invention, media analysis agent 104 selectively invokes shot boundary detector 212 to segment the received video content into uniquely identifiable shots. According to one example implementation, to be developed more fully below, shot boundary detector 212 analyzes the light histogram difference of successive frames to identify disparate shots within the sequence of frames. If the histogram difference reaches a particular threshold, shot boundary detector 212 invokes an instance of flashlight detector 214, to distinguish a potential flashlight condition from an actual shot cut boundary. In addition, rather than rely on global pre-defined threshold(s) (which it could use in alternate embodiments), media analysis engine 204 is depicted comprising an adaptive threshold selection module 216 to dynamically select thresholds that are representative of the content being analyzed. Based, at least in part on the analysis of light intensity of the video content, media analysis engine 204 segments the received media into shots for subsequent content-based access and retrieval. It is to be appreciated that, although depicted as a number of disparate functional blocks, one or more of elements 202–220 may well be combined into one or more blocks, without deviating from the spirit and scope of the present invention.

According to one implementation, controller(s) 202 receive media content from any of a number of sources including, for example, local memory storage (206), remote media provider(s) and/or content storage source(s), and audio/video devices communicatively coupled to media analysis agent 104. According to one implementation, the media content is received from remote sources by controller(s) 202 and placed in storage/memory 218 for analysis. According to one implementation, the media is received by the host computer 102 in compressed form and is decompressed before presentation to media analysis agent 104. In an alternate implementation, controller(s) 202 selectively invoke a decoder application (e.g., 210) resident within or outside of media analysis agent 104 to decode media received in compressed form before selectively invoking the media analysis engine 204.

But for the innovative aspects of the invention, described above, controller(s) 202 is intended to represent any of a wide variety of control logic known in the art such as, for example, a processor, an application specific integrated circuit (ASIC), a field programmable gate array (FPGA), a programmable logic array (PLA), and the like. Moreover, it should be appreciated that controller(s) 202 may well be implemented in software as a plurality of executable instructions which, when executed (e.g., by processing unit 132), implement the control functions described above.

Media analysis engine 204 is selectively invoked by controller(s) 202 to segment media content into uniquely identifiable shots of video content. As introduced above, media analysis engine 204 includes a shot boundary detector 212 that analyzes the light histogram difference of a sequence of frames to identify shot boundaries. More particularly, shot boundary detector 212 generates a light histogram for each frame of video content and analyzes successive frames' histograms difference for indications denoting a shot change. According to one example implementation, shot boundary detector 212 implements a twin-threshold detection scheme, wherein one or more statistics generated from the histograms are compared to two thresholds to identify shot boundaries.

According to one implementation, shot boundary detector 212 utilizes a high threshold, Tb, and a lower threshold, Ts, in the twin-threshold detection scheme. A high histogram difference threshold (Tb) is set, wherein content that exceeds this high threshold might include a flashlight or a shot boundary. Accordingly, in accordance with one aspect of the present invention, shot boundary detector 212 selectively invokes an instance of the flashlight detector module 214 to determine whether the high light intensity is due to a flashlight condition or an actual shot boundary.

If the histogram difference does not exceed the high threshold, Tb, but does exceed a lower threshold (Ts), it is regarded as a start frame of gradual transition, and shot boundary detector 212 analyzes several frames of such content to determine whether a gradual shot transition is taking place over several frames. According to one implementation, shot boundary detector 212 accumulates the histogram difference over two or more frames to see if, after accumulating two or more frames worth of deviation, the accumulated difference exceeds the high threshold, Tb. If so, shot boundary detector identifies a gradual transition shot boundary. If not, the candidate is abandoned and shot boundary detector 212 continues with analysis of the next frame.

As introduced above, media analysis engine 104 does not rely on the conventional practice of global, pre-set thresholds or thresholds that are arbitrarily set based on the content of a sliding window of frames. Rather, media analysis engine 204 includes an adaptive threshold selection module 216 incorporates certain safeguards that ensure that thresholds are set in accordance with the received video content only if the content is relatively stable. According to one example implementation, adaptive threshold selection module 216 generates a sliding window of frames preceding the current frame, and analyzes the frames within the sliding window to generate a statistical model of the light intensity of the frames within the window. In one implementation, for example, threshold selection module 216 generates a sliding window of 15–25 frames, and calculates an average value and standard deviation of histogram differences within the sliding window. The average value is used to calculate each of the low threshold, Ts, and the high threshold, Tb. According to one example implementation, the low threshold Ts is set to two- to three-times the average intensity, while the high threshold Tb is set to four- to five-times the average intensity.

Unlike convention threshold selection schemes, however, adaptive threshold selection module 216 verifies the appropriateness of the resultant thresholds before using the threshold(s) to determine whether the current frame is a shot boundary. According to one implementation, threshold selection module 216 analyzes the standard deviation of the intensity values within the window to determine whether the frames within the sliding window present a relatively stable light intensity model. If, for example, selection module 216 were to calculate the standard deviation of light intensity over several frames that included several flashlights, the average intensity would be so high, compared to the other media, that setting thresholds based upon such content would provide for artificially high thresholds, perhaps resulting in missed shot boundaries. However, such a window of several flashlights will be characterized by a relatively high standard deviation, which is an indicator to threshold selection module 216 that, perhaps, the data is not a good source from which to develop thresholds. According to one implementation, if the standard deviation is higher than a threshold, that is to say the distribution of histogram differences within the sliding window is dispersed, a threshold calculated based on such data is untrustworthy. The reason being that the video content in the window is changing too drastically to be of use in threshold selection. In such a circumstance, threshold selection module 216 reverts to the last acceptable thresholds, Ts and Tb. According to another embodiment, upon determining that the values within the sliding window do not support accurate thresholds, threshold selection module 216 adopts predetermined thresholds for use until the frames within the sliding window do not result in such a high standard deviation.

It is to be appreciated that use of an average and standard deviation of frame histograms is but one example of any of a number of alternate statistical tools which threshold selection module 216 could bring to bear to dynamically generate and verify thresholds for use in accordance with the teachings of the present invention. Any of a number of alternate statistical tools such as, for example, Analysis of Variance (ANOVA), test analysis, and the like may well be used to set and verify the veracity of a threshold without deviating from the spirit and scope of the present invention.

As introduced above, the flashlight detector 214 is selectively invoked to determine whether one or more frames, with a histogram difference between consecutive frames that exceeds some threshold (e.g., Tb) is the result of a flashlight or a shot transition. In general, flashlight detector 214 analyzes one or more attributes of a current frame against such attributes of frames in a sliding window to the right and to the left of the current frame to determine whether the light histogram variation is the result of a relatively isolated flashlight, or the result of a shot transition.

According to one example implementation, flashlight detector 214 generates a ratio of the light intensity of the current frame as compared to sliding windows of frames on either side of the current frame. More particularly, flashlight detector utilizes the average intensity difference (AID) measure to distinguish flashlight events from actual shot boundaries. Following are definitions of some metrics that are used in the shot detection method.

$$D_i = \sum_{j=1}^{Bins} |H_i(j) - H_{i-1}(j)| \qquad (1)$$

$$AI_i = \sum_{j=1}^{Bins} j * H_i(j) \Big/ \sum_{j=1}^{Bins} H_i(j) \qquad (2)$$

$$AI_{i-1} = \sum_{j=1}^{Bins} j * H_{i-1}(j) \Big/ \sum_{j=1}^{Bins} H_{i-1}(j) \qquad (3)$$

$$AID_i = AI_i - AI_{i-1} \qquad (4)$$

Where $H_i(j)$ indicates the histogram value for gray level j in frame i. Bins is the bin number for the histogram, generally we choose 256 for gray level histogram. For a color image, each bin represents the intensity of a color. Typically, there are 256 bins for each color component (Red, Green, and Blue) in a color image. For a gray image, each bin represents an intensity of gray-level. Typically, there are 256 bins for a gray image (i.e., one bin for each of the 256 gray levels). $D_i$ denotes the histogram difference between frame i and its preceding frame (i–1). $AI_i$ is the average intensity value of the frame i, and $AID_i$ is the average intensity difference between frame i and frame (i—1).

According to one implementation, introduced above, the metric D (equation 1) is compared to the high threshold, Tb, by shot boundary detector 212 to decide whether to invoke flashlight detector module 214, while metric AID (equation 4) is used by flashlight detector module 214 to distinguish a shot boundary from a flashlight event. To distinguish a shot cut from a flashlight event, flashlight detector module 214 compares the result of the average intensity analysis, above, to a cut model and a flashlight model.

Figure 3:
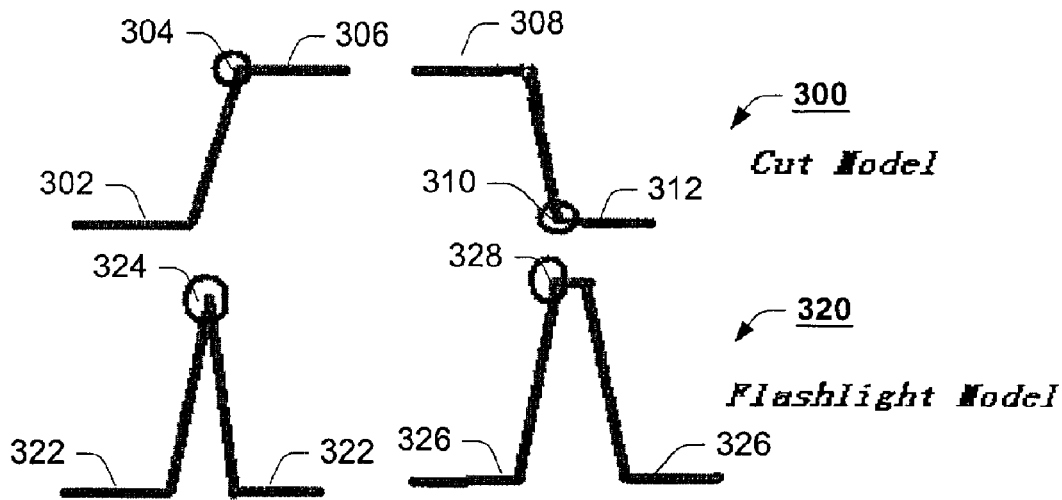
FIG. 3 is a graphical illustration distinguishing the shot cut model from the flashlight model, according to one aspect of the present invention.

Turning briefly to FIG. 3, a graphical illustration of an example ideal cut model and ideal flashlight event model is presented, according to one embodiment of the present invention. In accordance with the illustrated example illustration of FIG. 3, a shot cut model 300 is presented as distinguished from the flashlight event model 320, according to one embodiment of the present invention. When a true abrupt transition occurs (304, 310), i.e., a shot cut, the average intensity changes from one level (302, 308) to another level (306, 312) and this change will sustain itself for at least a relatively long period during the next whole shot. Alternatively, when a flashlight occurs (324, 328), the average intensity changes from one level (322, 326) to another level, and then fall back to the original level (322, 326), usually, within a couple of frames, which is significantly less than that of the true cut case.

Returning to FIG. 2, flashlight detector 214 defines two parameters (or, 'heights') used to classify a frame in which an abrupt change in intensity occurs:

H1: the average intensity difference between current frame and previous frame

H2: the average intensity difference between frames in left sliding window preceding the current frame and frames in right sliding window after the current frame.

In the ideal flashlight model (320 of FIG. 3), the H2 parameter goes to zero (0) because the average intensity of frames preceding the current frame and the average intensity of frames after the current frames are at the same level (e.g., 322, 326) within the same shot. Alternatively, in the ideal cut model (300 of FIG. 3), the H2 parameter is substantially identical to the H1 parameter because the average intensity of frames preceding the current frame (302, 308) is not at the same level with that of frames (306, 312) after the current frames.

Accordingly, flashlight detector module 214 calculates a ratio of the H1 and H2 parameters, in accordance with equation (5) below:

$$\text{Ratio} = H1/H2 \quad (5)$$

According to one implementation, the H2 parameter is calculated using the average intensities of 5–7 frames preceding current frame (i.e., left sliding window of frames), and the average intensities of 5–7 frames after the current frame (right sliding window). It will be appreciated that sliding windows of more or less frames could well be used, the size of 5–7 frames described herein is chosen because flashlight events do not, generally, last longer than 5–7 frames. According to one example implementation, flashlight detector module 214 reduces computational complexity by utilizing only a subset of the frames within each sliding window to generate the average intensity (AI) for the sliding window. According to one implementation, flashlight detector 214 utilizes the minimal two of all frames within the sliding window as the average intensity level for the sliding window. By using only the minimal two of all the frames within the sliding window, the effect of the flashlight on the average is reduced, and one or two statistically unstable (in terms of light intensity) frames are omitted from the calculation.

As Ratio goes to a value of one (1), flashlight detector 214 concludes that the intensity change is due to a shot cut event and is, therefore indicative of a shot boundary. Deviations from a Ratio value of one are determined to be indicative of a flashlight event.

As used herein, storage/memory 206 and input/output interface(s) 208 are each intended to represent those elements as they are well known in the art. Storage/memory 206 is utilized by media analysis agent 104 to maintain, at least temporarily, media content 218 and detected shots 220. The I/O interface(s) 208 enable media analysis agent 104 to communicate with external elements and systems, facilitating a distributed architecture and remote operation.

Application(s) 210 are intended to include a wide variety of application(s) which may use, or be used by, media analysis engine 204. In this regard, application(s) 210 may well include a graphical user interface (GUI), a media player, a media generator, a media database controller, and the like.

Given the foregoing, it is to be appreciated that media analysis agent may well be implemented in a number of alternate embodiments. According to one implementation, media analysis agent 104 is implemented in software as a stand-alone application, as a subset of a higher-level multimedia application such as, for example, a media decoder application, a media rendering application, a browser application, a media player application, and the like. Alternatively, media analysis agent 104 may well be implemented in hardware, e.g., in an application specific integrated circuit (ASIC), a controller, a programmable logic device (PLD), in a multimedia accelerator peripheral, and the like. Such alternate implementations are anticipated within the scope and spirit of the present invention.

EXAMPLE DATA STRUCTURE

FIG. 4 graphically illustrates an example data structure within which detected shots are stored, according to one embodiment of the present invention. As introduced above, once shot boundary detector 212 and/or flashlight detector module 214 have identified a shot boundary, the frames accumulated by shot boundary detector 212 since the last identified shot boundary and the currently identified shot boundary are segmented into a uniquely identifiable shot within memory 216. More particularly, the frames comprising such shots are initially stored in memory 220. In accordance with the illustrated example embodiment of FIG. 4, memory 206 is depicted comprising a subset (220) within which is stored a plurality of frames (402–406) associated with a detected shot. While one shot is currently depicted, it is to be appreciated that the size of detected shot memory 220 increases to service the number of shots detected by media analysis engine 204.

Once the media analysis agent 104 has completed segmenting received media content, controller 202 may well promote the detected shots from memory 220 to another storage location, e.g., a mass storage device, etc.

EXAMPLE OPERATION AND IMPLEMENTATION

Having introduced the operating environment and functional elements of media analysis agent 104 with reference to FIGS. 1–4, above, the operation of the system will now be developed more fully below with reference to FIGS. 5–7, below. For ease of illustration, and not limitation, the operation of media analysis agent 104 will be developed below in the context of segmenting video content. However, as introduced above, the teachings of the present invention may well be adapted to segmenting other types of media content such as, for example, audio content.

Figure 5:
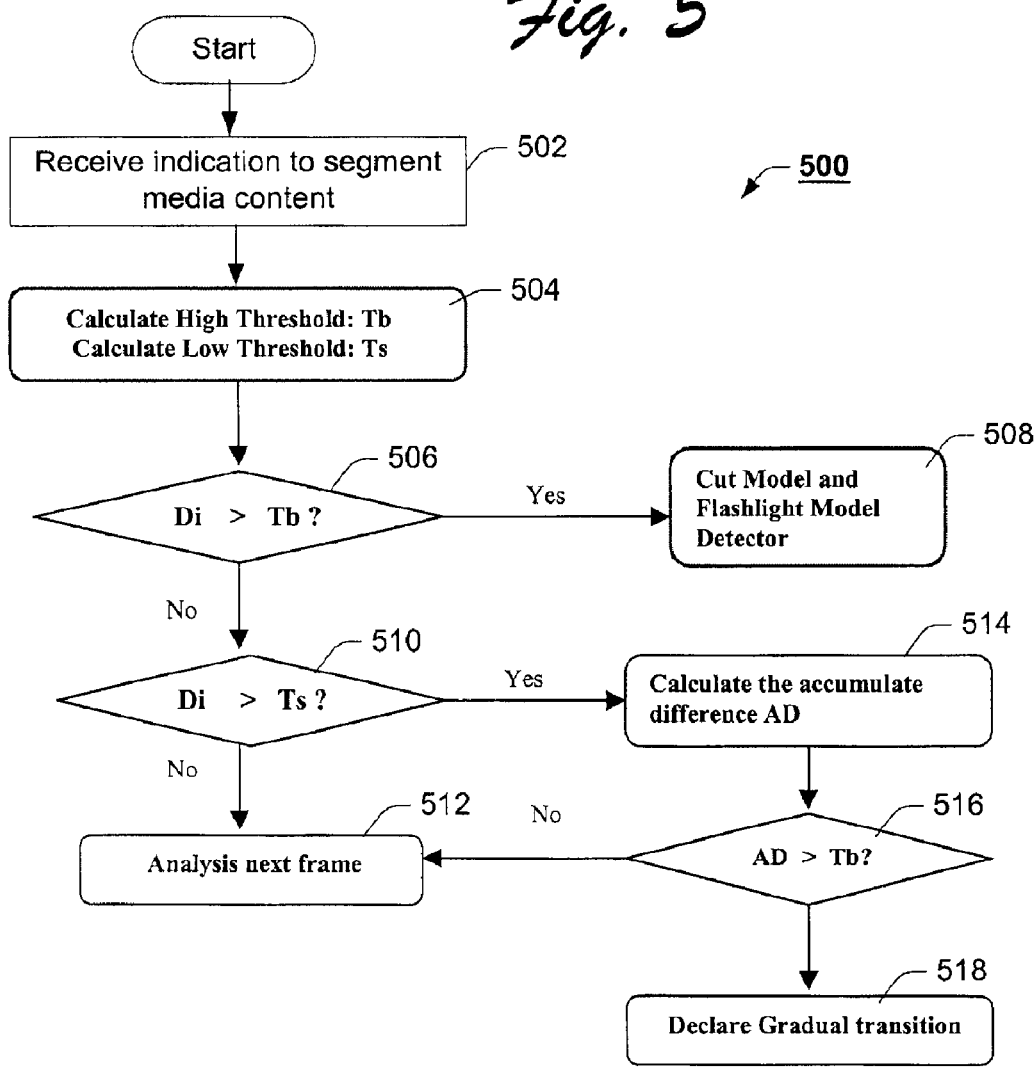
FIG. 5 is a flow chart of an example method of shot boundary detection, according to one embodiment of the present invention.

FIG. 5 is a flow chart of an example method of shot boundary detection, according to one embodiment of the present invention. In accordance with the illustrated example implementation of FIG. 5, the method begins with block 502 wherein media analysis agent 104 receives an indication to segment media content into shots. In response, media analysis agent 104 selectively invokes an instance of shot boundary detector 212 of media analysis engine 204 to parse media content into uniquely identifiable shots. According to one implementation, introduced above, shot boundary detector 212 utilizes a multi-threshold boundary detection scheme to facilitate detection of both abrupt boundaries as well as gradually occurring boundaries.

In block 504, to facilitate the accurate detection of shot boundaries, shot boundary selection module 212 invokes an instance of adaptive threshold selection module 216 to calculate a high threshold (Tb) and a low threshold (Ts) for use in the multi-threshold detection scheme of the shot boundary detector 212. As introduced above, and developed more fully below, adaptive threshold selector module 216 calculates proposed threshold values (Tb, Ts) based on one or more attributes of frames in a sliding window of frames adjacent to a current frame. An example method for threshold selection is developed more fully below, with reference to FIG. 8.

In block 506, shot boundary detector 212 determines whether a change in light intensity between adjacent frames exceeds a threshold value. More particularly, as introduced above, shot boundary detector 212 calculates a difference in intensity histograms between two adjacent frames (Di), in accordance with equation 1, above. This difference is then compared to the high threshold Tb. If the difference in light intensity histograms (Di) exceeds the high threshold, shot boundary detector 212 concludes that there has been an abrupt change in light intensity across adjacent frames and selectively invokes an instance of the flashlight detector module 214 to determine whether the abrupt change was caused by an abrupt shot boundary (e.g., caused by a shot cut), or whether the change was caused by a flashlight event, block 508. An example method for distinguishing a shot cut from a flashlight event is presented in more detail below, with reference to FIG. 6.

If, in block 506, the histogram difference does not exceed the high threshold, shot boundary detector 212 determines whether it reaches a lower threshold, Ts, block 510. As introduced above, the lower threshold (Ts) is set as an indicator of a potential gradual transition between shots, e.g., a fade, wipe, etc. If the histogram difference does not exceed the low threshold, Ts, shot boundary detector 212 concludes that the frame does not represent a boundary condition, and the analysis continues with the next frame in the sequence, block 512.

If, in block 510, the histogram difference does exceed the lower threshold, Ts, shot boundary detector 212 adds the histogram difference to an Accumulated Difference (AD) for a number of frames (N), block 514. The AD is then compared to the high threshold, Tb, block 516. If the accumulate difference exceeds the high threshold, Tb, shot boundary detector 212 concludes that a gradual shot boundary has been reached, block 518 and the frames comprising the shot are added to the detected shot memory 220.

If, the AD does not exceed the high threshold, Tb, in block 516, the process continues with block 512 with analysis of the next frame in the sequence.

It is to be appreciated that the multi-threshold shot boundary detection scheme introduced above facilitates detection of both hard, abrupt shot boundaries and gradual shot boundaries utilizing dynamically determined, and verified thresholds that are appropriately sized given the content of the media analyzed. Moreover, the multi-threshold shot boundary detection scheme distinguishes abrupt deviations in light intensity that are due to shot cut from those due to flashlight events within and across shot boundaries, thereby improving shot boundary detection performance by eliminating the false-positive identification often associated with flashlight events.

Figure 6:
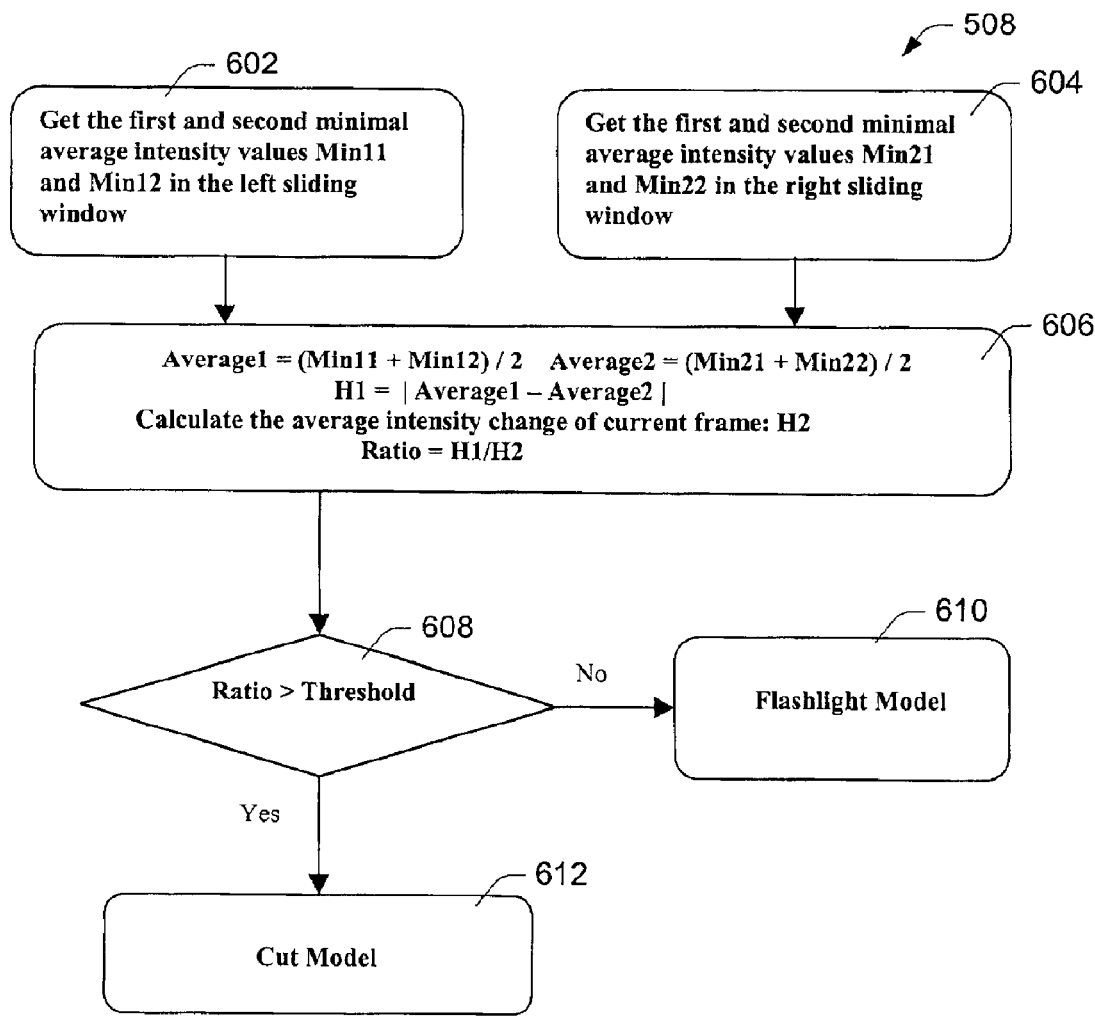
FIG. 6 is a flow chart of an example method of distinguishing a cut model from a flashlight model in shot boundary analysis, according to one aspect of the present invention.

FIG. 6 is a flow chart of an example method of distinguishing a cut model from a flashlight model, according to one aspect of the present invention. It is to be appreciated that although introduced in the context of the innovative multi-threshold boundary detection scheme introduced above, the method of FIG. 6 may well be used in conjunction with other shot boundary detection schemes.

In accordance with the illustrated example embodiment of FIG. 6, the method of block 508 (of FIG. 5) begins with blocks 602 and 604. In block 602, flashlight detector module 214 identifies the first and second minimal average intensity values (Min 11 and Min 12) in a left sliding window of frames. Similarly, in block 604, flashlight detector module 214 identifies the first and second minimal average intensity values (Min 21 and Min 22) in a right sliding window of frames. As introduced above, the left sliding window of frames may comprise the 5–7 frames prior to (left sliding window), and subsequent to (right sliding window) the current frame from which the minimal average intensity values are chosen.

In block 606, flashlight detector 214 calculates the average intensity (AI) for each of the sliding windows utilizing the minimal two average intensities of each window identified in blocks 602 and 604, respectively. The absolute value of the difference in average intensity of the left sliding window and the right sliding window is calculated and assigned to the parameter H1. In addition, flashlight detector module 214 calculates the average intensity change of the current frame, H2, as well as the Ration of H1 to H2 (per equation 5, above).

In block 608 flashlight detector module determines whether the calculated Ration (eqn. 5) is greater than a threshold indicator. According to one implementation, a ratio that varies from a value of one (1) is an indicator of a 214 concludes that the ratio is indicative of a flashlight event, not a shot boundary, and processing continues with block 512 of FIG. 5.

If flashlight detector 214 determines that the ratio does exceed the set threshold, it concludes that a shot boundary has been detected, block 612. Accordingly, shot boundary detector 212 stores the frames comprising the identified shot in the detected shot memory 220. Upon detecting a shot boundary and storing the frames comprising the shot, shot boundary detector 212 sets the accumulated difference (AD) value to zero (0), and continues the analysis with the next frame in the sequence of frames, if any remain.

Figure 7:
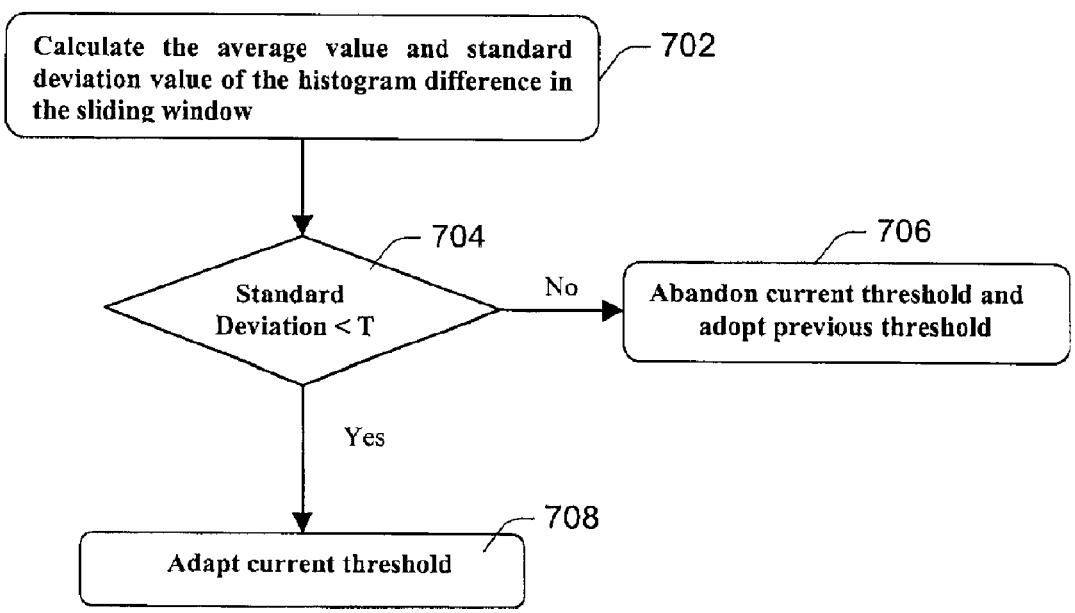
FIG. 7 is a flow chart of an example method of dynamically generating an adaptive threshold to identify shot boundaries in a video sequence, according to one aspect of the present invention.

FIG. 7 is a flow chart of an example method of dynamically generating an adaptive threshold(s) to identify shot boundaries in a video sequence, according to one aspect of the present invention. As above, it is to be appreciated that although depicted in accordance with the multi-threshold shot boundary detection scheme, the method of FIG. 7 may well be applied to other means of detecting shot boundaries and is not limited to the example implementation.

In accordance with the illustrated example implementation of FIG. 7, the method of block 504 (FIG. 5) begins with block 702, where adaptive threshold selection module 216 calculates an average and standard deviation values of the histogram difference(s) in a sliding window. As introduced above, the sliding window may well be 20–25 frames, although windows of greater or less frames may well be used. From the calculated average intensity difference (AID) of histograms in the sliding window, adaptive threshold selection module 216 generates a proposed set of thresholds. According to one implementation, the proposed low threshold is 2–3 times the average, while the proposed high threshold is 4–5 times the average.

In block 704, adaptive threshold selection module 216 determines whether the standard deviation of the average intensity values of the sliding window reach a certain threshold. As introduced above, the higher the standard deviation, the more unreliable the thresholds will be. Accordingly, the standard deviation threshold is set to ensure the calculated low- and high threshold values used in the boundary detection provide accurate results. If the standard deviation meets or exceeds the standard deviation threshold, the proposed low and high threshold values (Ts, Tb) are abandoned in favor of a previous threshold, block 706.

If, however, the standard deviation does not reach or exceed the standard deviation threshold, the proposed threshold values of Ts and Tb are introduced for use in the multi-threshold boundary selection scheme of FIG. 5, block 708.

Alternate Embodiment(s)

Figure 8:
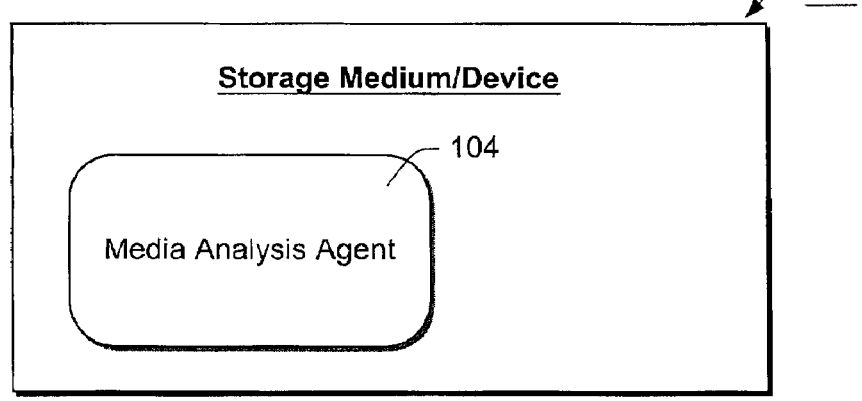
FIG. 8 is a block diagram of an example storage medium having stored thereon a plurality of executable instructions

FIG. 8 is a block diagram of a storage medium having stored thereon a plurality of instructions including instructions to implement the teachings of the present invention, according to yet another embodiment of the present invention. In general, FIG. 8 illustrates a storage medium/device 800 having stored thereon a plurality of executable instructions including at least a subset of which that, when executed, implement the media analysis agent 104 of the present invention.

As used herein, storage medium 800 is intended to represent any of a number of storage devices and/or storage media known to those skilled in the art such as, for example, volatile memory devices, non-volatile memory devices, magnetic storage media, optical storage media, and the like. Similarly, the executable instructions are intended to reflect any of a number of software languages known in the art such as, for example, C++, Visual Basic, Hypertext Markup Language (HTML), Java, eXtensible Markup Language (XML), and the like. Moreover, it is to be appreciated that the storage medium/device 800 need not be co-located with any host system. That is, storage medium/device 800 may well reside within a remote server communicatively coupled to and accessible by an executing system. Accordingly, the software implementation of FIG. 8 is to be regarded as illustrative, as alternate storage media and software embodiments are anticipated within the spirit and scope of the present invention.

Although the invention has been described in language specific to structural features and/or methodological steps, it is to be understood that the invention defined in the appended claims is not necessarily limited to the specific features or steps described. For example, the inventive concepts presented herein may well be used to identify distinct audio content (e.g., songs) on a storage medium populated with a plurality of such audio content (e.g., a music CD). In accordance with this alternate implementation, an application 210 of media analysis agent 104 generates a light histogram representation of the audio content. Any of a number of techniques may well be used to perform this audio to visual transform such as, for example, spectral analysis and the like. Once transformed, media analysis agent 104 proceeds, as described above, to parse the audio content into uniquely identifiable segments. Thus, it is to be appreciated that the specific features and steps are disclosed as but an example implementation of the broader inventive concepts introduced herein.

What is claimed is:

1. A method comprising;
identifying an abrupt transition in average light intensity between two frames, wherein identifying an abrupt transition comprises;
  calculating a difference in light intensity histograms between the current frame and a preceding frame; and
  comparing the histogram difference to a dynamically determined threshold, wherein an abrupt transition is indicated if the histogram difference exceeds the threshold, and wherein dynamically determining the threshold comprises:
    calculating an average and standard deviation value of the histogram difference in a sliding window of frames;
    generating one or more thresholds as multiples of the calculated average; and
    determining whether the calculated standard deviation falls below a standard deviation threshold before adopting the generated one or more thresholds; and
determining whether the abrupt transition was caused by a shot boundary between the two frames or by a flashlight event.

2. A method according to claim 1, wherein generating one or more thresholds comprises:
calculating a high threshold that is four- to five-times the calculated average; and
calculating a low average that is two- to three-limes the calculated average.

3. A method according to claim 2, wherein the high threshold is used to determine whether an abrupt transition has occurred.

4. A method according to claim 2, wherein the low threshold is used to indicate whether a gradual transition has occurred, if the histogram difference does not exceed the high threshold.

5. A method according to claim 4, further comprising:
comparing the histogram difference to the low threshold;
accumulating the histogram difference of two or more frames if the histogram difference exceeds the low threshold; and
determining that a gradual transition has occurred if the accumulated histogram difference exceeds the high threshold.

6. A method according to claim 1, wherein determining a cause of the abrupt transition comprises:
calculating a difference in average minimal intensity value between a window of frames preceding the current frame and a window of frames subsequent to the current frame;
generating a ratio of the average intensity change of the current frame to the calculated difference in average minimal intensity values; and
concluding that the abrupt transition is caused by a flashlight event if the ratio does not exceed a threshold.

7. A method according to claim 6, wherein calculating a difference in average minimal intensity values comprises:
identifying a window of frames on either side of the current frame;
generating an average minimal intensity value for each window from a first and second minimal intensity value of each frame, respectively; and
calculating the difference between the generated average minimal intensity values.

8. A method according to claim 6, wherein the threshold is equal to one (1), wherein a ratio that deviates from one indicates that the abrupt transition is due to a shot cut, while a ratio close to one indicates that the abrupt transition is due to a flashlight event.

9. A computer readable medium storing a plurality of executable instructions which, when executed, implement a method according to claim 1.

10. A media analysis agent comprising:
   a shot boundary detector to statistically analyze one or more attributes associated with content in video frames to detect abrupt and gradual transitions in the video content indicative of a shot boundary; and
   a flashlight detector, responsive to the shot boundary detector, to distinguish abrupt transitions in the video content caused by flashlight events from those caused by actual shot boundaries, to reduce false-positive identification of flashlight events as shot boundaries; and
   an adaptive threshold selection module, responsive to the shot boundary detector, to dynamically set one or more thresholds for use in shot boundary identification based, at least in part, on one or more attributes of video content, wherein the adaptive threshold selection module calculates an average and standard deviation of a histogram difference in a sliding window of frames surrounding the current frame, and generates a proposed low threshold value (Ts) and a proposed high threshold value (Tb) from the average histogram difference, and wherein the proposed low threshold is two- to three-times the calculated average histogram difference, while the proposed high threshold is four- to five-times the calculated average histogram difference.

11. A media analysis agent according to claim 10, wherein the adaptive threshold selection module certifies the proposed thresholds if the calculated standard deviation does not reach a standard deviation threshold.

12. A media analysis agent according to claim 11, wherein if the adaptive threshold selection module cannot certify the proposed thresholds, prior thresholds are used by shot boundary detector.

13. A media analysis agent according to claim 10, wherein the high threshold is used to identity an abrupt transition, while the low threshold is used to indicate a potential gradual transition.

14. A media analysis agent according to claim 13, wherein shot boundary detector compares the histogram difference to a low threshold if the difference does not exceed the high threshold, and accumulates the histogram differences of frames wherein the difference exceeds the low threshold.

15. A media analysis agent according to claim 14, wherein shot boundary detector identifies a gradual transition when the accumulated histogram differences exceed the high threshold.

16. A media analysis agent according to claim 10, wherein the shot boundary detector calculates a difference in light intensity histograms between a current frame and a preceding frame, and compares the histogram difference to a dynamically determined threshold, wherein an abrupt transition is identified by a histogram difference that exceeds the threshold.

17. A media analysis agent according to claim 16, wherein shot boundary detector invokes an instance of flashlight detector to determine whether the abrupt transition is the result of a flashlight event.

18. A media analysis agent according to claim 10, wherein flashlight detector calculates a difference in average minimal intensity values between a first sliding window preceding the current frame, and a second sliding window subsequent to the current frame.

19. A media analysis agent according to claim 18, wherein flashlight detector calculates the average intensity change of the current frame, and generates a ratio of the difference in average minimal intensity values to the average intensity change of the current frame.

20. A media analysis agent according to claim 19, wherein flashlight detector determines that the abrupt change was due to a flashlight event if the ratio does not exceed a threshold value.

21. A media analysis agent according to claim 20, wherein the threshold value is one (1).

22. A media analysis agent according to claim 20, wherein the flashlight detector concludes that the abrupt transition was caused by a shot boundary if the ratio exceeds the threshold value.

23. A computing system comprising:
   a memory, to receive media content; and
   a media processing system, coupled to the memory device, including a media analysis agent according to claim 10 to segment the received media content into uniquely identifiable shots.

24. One or more computer-readable media having stored thereon a computer program that, when executed by one or more processors, causes the one or more processors to;
   calculate a difference in light intensity histograms between two frames;
   compare the histogram difference to a dynamically determine threshold, wherein an abrupt transition is indicated if the histogram difference exceeds the threshold, wherein to determine the dynamic threshold, the one or more processors:
     calculate an average and standard deviation value of the histogram difference in a sliding window of frames;
     generate one or more thresholds as multiples of the calculated average; and
     determine whether the calculated standard deviation falls below a standard deviation threshold before adopting the generated one or more thresholds; and
   determine whether the abrupt transition was caused by a shot boundary between the two frames or by a flashlight event.

25. One or more computer-readable media as recited in claim 24 wherein to determine a cause of the abrupt transition, the one or more processors:
   calculate a difference in average minimal intensity values between a window of frames preceding the current frame and a window of frames subsequent to the current frame;
   generate a ratio of the average intensity change of the current frame to the calculated difference in average minimal intensity values; and
   conclude that the abrupt transition is caused by a flashlight event if the ratio does not exceed a threshold.

26. One or more computer-readable media as recited in claim 25 wherein the threshold is equal to one, wherein a ration that deviates from one indicates that the abrupt transition is due to a shot cut, while a ratio close to one indicates that the abrupt transition is due to a flashlight event.

* * * * *